(12) United States Patent
Yang et al.

(10) Patent No.: US 12,477,179 B2
(45) Date of Patent: Nov. 18, 2025

(54) METHOD AND APPARATUS FOR ANALYZING SATISFACTION OF SCREEN SPORTS CONTENTS USER

(71) Applicant: ELECTRONICS AND TELECOMMUNICATIONS RESEARCH INSTITUTE, Daejeon (KR)

(72) Inventors: Seong Il Yang, Daejeon (KR); Jong Sung Kim, Daejeon (KR); Min Sung Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 84 days.

(21) Appl. No.: 18/539,047

(22) Filed: Dec. 13, 2023

(65) Prior Publication Data
US 2024/0292057 A1    Aug. 29, 2024

(30) Foreign Application Priority Data
Feb. 24, 2023  (KR) ........................ 10-2023-0025171

(51) Int. Cl.
*H04N 21/442* (2011.01)
*G06F 40/30* (2020.01)
*H04N 21/4788* (2011.01)

(52) U.S. Cl.
CPC ....... *H04N 21/44213* (2013.01); *G06F 40/30* (2020.01); *H04N 21/4788* (2013.01)

(58) Field of Classification Search
CPC .......... H04N 21/44213; H04N 21/4788; G06F 40/30; G06F 40/279; G06Q 50/10; A63F 13/87; G06N 20/00

(Continued)

(56) References Cited

U.S. PATENT DOCUMENTS

| 10,835,823 | B2 | 11/2020 | Sumant et al. |
| 10,950,234 | B2 | 3/2021 | Mao |

(Continued)

FOREIGN PATENT DOCUMENTS

| KR | 10-2017-0107287 A | 9/2017 |
| KR | 101962421 B1 * | 7/2019 |

(Continued)

OTHER PUBLICATIONS

J. Kim, K. Park, H. Song, J. Y. Park and M. Cha, "Learning How Spectator Reactions Affect Popularity on Twitch," 2020 IEEE International Conference on Big Data and Smart Computing (BigComp), Busan, Korea (South), 2020, pp. 147-154, doi: 10.1109/BigComp48618.2020.00-84. (Year: 2020).*

*Primary Examiner* — Cynthia M Fogg

(57) ABSTRACT

The present disclosure provides a method and device for analyzing user satisfaction of screen sports contents. According to one embodiment, the present disclosure provides a method of analyzing user satisfaction of a screen sports content, including generating first satisfaction detection information based on real-time chat data of a user using a text feature recognition model, generating second satisfaction detection information based on real-time chat data of the user using a language feature recognition model, and predicting real-time satisfaction of the user based on the first satisfaction detection information and the second satisfaction detection information using a satisfaction prediction model.

8 Claims, 4 Drawing Sheets

(58) Field of Classification Search
USPC .............................................................. 725/9
See application file for complete search history.

(56) References Cited

U.S. PATENT DOCUMENTS

| | | | |
|---|---|---|---|
| 10,953,322 B2 | 3/2021 | Trombetta et al. | |
| 2018/0247549 A1* | 8/2018 | Martin | G09B 19/00 |
| 2018/0351901 A1* | 12/2018 | Snider | H04L 51/42 |
| 2020/0076746 A1* | 3/2020 | Penrose | G06N 3/08 |
| 2022/0284884 A1* | 9/2022 | Tongya | G06F 40/242 |
| 2023/0102892 A1* | 3/2023 | Wu | G06F 40/30 |
| | | | 707/737 |
| 2023/0267934 A1* | 8/2023 | Oh | G10L 15/32 |
| | | | 704/243 |

FOREIGN PATENT DOCUMENTS

| | | |
|---|---|---|
| KR | 10-2090720 B1 | 4/2020 |
| KR | 10-2285329 B1 | 8/2021 |

\* cited by examiner

METHOD AND APPARATUS FOR ANALYZING SATISFACTION OF SCREEN SPORTS CONTENTS USER

CROSS-REFERENCE TO RELATED APPLICATIONS

This application is based on, and claims priority to, Korean Patent Application Number 10-2023-0025171, filed on Feb. 24, 2023, the disclosure of which is incorporated by reference herein in its entirety.

TECHNICAL FIELD

The present disclosure relates to a method and device for analyzing user satisfaction of screen sports contents. Specifically, the present disclosure relates to a method and device for analyzing user satisfaction in real time based on real-time chat data of users who have multiple accesses online in an experiential sports game played using screen sports contents.

BACKGROUND

The following descriptions serve solely to provide the background information related to the present embodiment and do not constitute the prior art.

With the development of machine learning algorithms such as deep learning, various methods of measuring user satisfaction using various types of data such as sensor data, image data, voice data, and text data have been proposed. For example, various emotion recognition models are being developed, such as recognizing facial expressions in human facial images to predict emotions, or recognizing and classifying a speaker's emotion from voice signals.

Recently, a variety of screen sports contents in which many people participate remotely through online service have been provided. Unlike an experiential content service for a single user in which only interaction between a content providing system and the user occurs, in the case of online-based experiential content for multiple users, not only the interaction between a content providing system and a user, but also interaction between users can occur in the process of experiencing the content. For example, users who experience a single screen sports content together may exchange information related to their current feelings with other users through voice or text. By using the real-time interaction information between users to comprehensively analyze the emotions that the users feel during the content experience process, the user's satisfaction can be analyzed in real time, and the user's real-time satisfaction is useful for improving the corresponding screen sports content or developing other sports contents. Therefore, there is a need for a method capable of accurately analyzing the satisfaction of screen sports content users in real time using real-time interaction information between the users.

SUMMARY

The main purpose of the present disclosure is to provide a method and device capable of predicting user satisfaction based on text features and language features of real-time chat data of screen sports content using a plurality of learning models, and automatically inferring real-time satisfaction of screen sports content users based on the satisfaction predicted using different characteristics.

The purposes of the present disclosure are not limited to those mentioned above, and other purposes not mentioned herein will be clearly understood by those skilled in the art from the following description.

According to one embodiment, the present disclosure provides a method of analyzing user satisfaction of a screen sports content, including generating first satisfaction detection information based on real-time chat data of a user using a text feature recognition model, generating second satisfaction detection information based on real-time chat data of the user using a language feature recognition model, and predicting real-time satisfaction of the user based on the first satisfaction detection information and the second satisfaction detection information using a satisfaction prediction model.

According to another embodiment, the present disclosure provides a satisfaction analysis device, including a memory that stores one or more instructions, and one or more processors to execute the one or more instructions stored in the memory, wherein the processor is configured to generate first satisfaction detection information based on real-time chat data of a user using a text feature recognition model, generate second satisfaction detection information based on the real-time chat data of the user using a language feature recognition model and predict real-time satisfaction of the user based on the first satisfaction detection information and the second satisfaction detection information using a satisfaction prediction model.

According to one embodiment of the present disclosure, by accurately analyzing the real-time satisfaction of the content user based on text features and language features, which are two different characteristics of real-time chat data of screen sports content, the quality of screen sports content service can be improved and the demand for the corresponding service can be increased.

The effects of the present disclosure are not limited to the effects mentioned above, and other effects not mentioned will be clearly understood by those skilled in the art from the description below.

DETAILED DESCRIPTION

Figure 1:
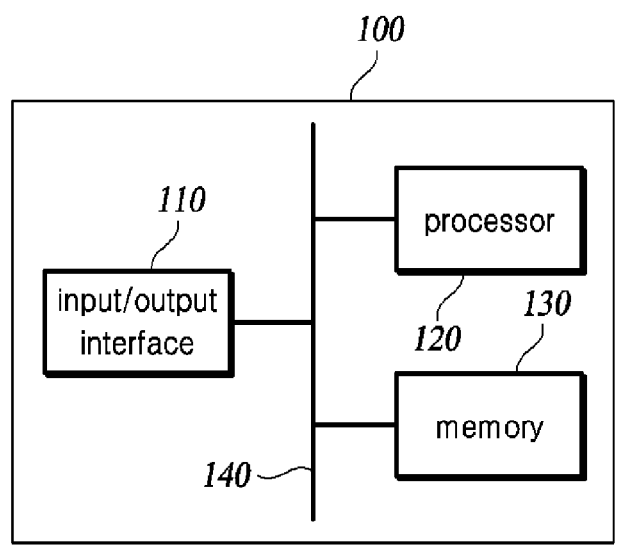
FIG. 1 is a block diagram of a satisfaction analysis device according to one embodiment of the present disclosure.

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Various ordinal numbers or alpha codes such as first, second, i), ii), a), b), etc., are prefixed solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The description of the present disclosure to be presented below in conjunction with the accompanying drawings is intended to describe exemplary embodiments of the present disclosure and is not intended to represent the only embodiments in which the technical idea of the present disclosure may be practiced.

FIG. 1 is a block diagram of a satisfaction analysis device according to one embodiment of the present disclosure.

Referring to FIG. 1, the satisfaction analysis device 100 includes all or some of an input/output interface 110, a processor 120, and a memory 130. In this case, the input/output interface 110, the processor 120, and the memory 130 can transmit data therebetween through a bus 140.

All blocks shown in FIG. 1 are not essential components of the satisfaction analysis device 100, and some blocks included in the satisfaction analysis device 100 may be added, changed, or deleted in another embodiment.

The input/output interface 110 may be connected to an external device to receive real-time chat data for predicting real-time satisfaction of a user in the process of experiencing screen sports content. For example, the input/output interface 110 may be communicatively connected to a screen sports content service server to receive real-time chat data input by a plurality of users. In this case, the input/output interface 110 may further include a hardware module such as a network interface card, a network interface chip, and a networking interface port, or a software module such as a network device driver or a networking program to configure a communication connection.

The input/output interface 110 may transmit real-time satisfaction data generated by the processor 120 to an external server or storage device. For example, the satisfaction analysis device 100 may transmit real-time satisfaction data to a service management server through the input/output interface 110, and a service provider of screen sports content may use the real-time satisfaction data for service quality management such as content updates and customer management.

The processor 120 generates first satisfaction detection information based on user real-time chat data using a text feature recognition model.

In the process of experiencing the screen sports content, the satisfaction analysis device 100 receives chat data between a plurality of users in real time. In this case, the chat data may include various text data related to conversations between the plurality of users during the content experience process. For example, during the content experience process, users may exchange not only conversations about their feelings during the content experience process, but also conversations to convey information about the content, and furthermore, conversations about content unrelated to the content.

User input conversation contents into a chat window in real time, and the input conversation contents are displayed to all users through the chat window in the order of input. Accordingly, the inputted real-time chat data may include a plurality of text data arranged according to the input order by a plurality of users.

The processor 120 generates a unit sentence by performing sentence refinement on real-time chat data. In this case, the sentence refinement is a process of pre-processing various text data included in the chat data into a sentence structure unit of a predetermined minimum size to obtain sentence structures or semantic features.

The generated unit sentence includes at least one word related to the emotion felt by the user. For example, when a user is playing a virtual baseball game with other users while staring at a baseball game image projected on a screen, the user may chat with other users in real time about the user's or other users' play, game scoring situation, or the likelihood of winning or losing the game. In this case, messages in text data format transmitted through chatting may include one or more unit sentences, each of which may include one or more words indicative of a particular emotion.

The processor 120 extracts text features based on the meaning of one or more words included in a unit sentence using the text feature recognition model that has been trained, and predicts a satisfaction level represented by the corresponding unit sentence based on the extracted text features.

Specifically, a unit sentence that indicates a user is satisfied may include words with meanings associated with positive emotions, such as joy, impressed, excited, expectation, calm, etc. On the other hand, a unit sentence that indicates a user is dissatisfied may include words with meanings associated with negative emotions, such as angry, dislike, disappointed, sad, etc. In this way, a user's satisfaction level can be measured based on satisfaction-related text features, which are determined by the presence of satisfaction-related text in the unit sentence and its distribution or frequency.

The trained text feature recognition model generates first satisfaction detection information based on the extracted text feature. The first satisfaction detection information may be digitized information about a probability that the input unit sentence is a sentence indicating the user's satisfaction.

The trained text feature recognition model may be a model trained to predict a user's satisfaction from the text features of the input unit sentence using a machine learning algorithm. Specifically, the text feature recognition model is trained to learn text features related to a preset satisfaction level using learning data generated based on a large amount of previous chat data, and to output the first satisfaction detection information regarding the probability that the unit sentence is a sentence indicating a user's satisfaction with the screen sports content based on the text features included in the corresponding unit sentence of the real-time chat data.

According to another embodiment, the text feature recognition model may be a neural network model trained using a deep learning algorithm to extract satisfaction-related text features based on the meaning of the text present in the unit sentence, and output the probability that the unit sentence corresponds to a sentence indicating satisfaction of the user as the first satisfaction detection information.

The processor 120 generates second satisfaction detection information based on the real-time chat data using a language feature recognition model.

The processor 120 performs sentence refinement on the real-time chat data to generate a unit sentence. In this case, the unit sentence is the same as the unit sentence input to the text feature recognition model. That is, the processor 120 generates the first satisfaction detection information and the second satisfaction detection information using the same single unit sentence for the real-time chat data.

The processor 120 extracts language features of the unit sentence and generates a speech expression attribute corresponding to the unit sentence. In this case, the speech expression attribute may be a user's emotional information implied from the structure of the unit sentence. The processor 120 may generate the speech expression attributes for the unit sentence using various natural language processing algorithms.

Specifically, the unit sentence is formed by arranging a plurality of words having respective meanings in a linguistic order. Therefore, the meaning of the sentence may vary according to the connection relationship between the words as well as the meaning of the text constituting the unit sentence.

For example, the user's emotion implied by the unit sentence may vary depending on expression attributes, such as word order, word repetition frequency, omission of a specific word class, etc., of the corresponding unit sentence.

The processor 120 extracts language features based on the speech expression attributes of the unit sentence using the language feature recognition model that has been trained, and predicts a user's satisfaction indicated by the corresponding unit sentence based on the extracted language features.

The trained language feature recognition model generates the second satisfaction detection information based on the extracted language feature. The second satisfaction detection information may be digitized information about the probability that the input unit sentence is a sentence indicating the user's satisfaction.

The trained language feature recognition model may be a model that has been trained to predict user satisfaction from the speech expression attributes of the input unit sentence using a machine learning algorithm. Specifically, the language feature recognition model is trained to learn speech expression attributes related to a preset satisfaction level using learning data generated based on a large amount of previous chat data, and to output the second satisfaction detection information regarding the probability that the unit sentence is a sentence indicating a user's satisfaction with the screen sports content based on the speech expression features included in the corresponding unit sentence of the real-time chat data.

According to another embodiment, the language feature recognition model may be a neural network model trained using a deep learning algorithm to extract satisfaction-related language features based on structural features of a unit sentence, and to output the probability that the unit sentence corresponds to a sentence indicating satisfaction of the user as the second satisfaction detection information.

The processor 120 predicts the user's real-time satisfaction level based on the first satisfaction detection information and the second satisfaction detection information using a satisfaction prediction model. In this case, the first satisfaction detection information and the second satisfaction detection information may be information about the user's satisfaction with respect to the same time point.

Specifically, one unit sentence is generated from chat data input by a user at a specific point in time during the entire screen sports content experience time period. Therefore, the first satisfaction detection information includes hourly user satisfaction prediction information predicted on the basis of text features of real-time chat data for the entire screen sports content experience time period, and the second satisfaction detection information includes hourly user satisfaction prediction information predicted based on the language features of the chat data at the time point corresponding to the first satisfaction detection information.

In the same time period, the change pattern of hourly user satisfaction probability value of the first satisfaction detection information and the change pattern of hourly user satisfaction probability value of the second satisfaction detection information may appear different from each other. The trained satisfaction prediction model may predict user experience satisfaction with the screen sports content based on the pattern characteristics of the first satisfaction detection information and the pattern characteristics of the second satisfaction detection information appearing at the satisfaction prediction time.

In this case, the satisfaction prediction model may be a model trained using a machine learning algorithm to determine final user satisfaction based on a probability value pattern of the input first satisfaction detection information and a probability value pattern of the second satisfaction detection information. Specifically, the satisfaction prediction model may be trained to learn actual user satisfaction corresponding to the patterns of two different satisfaction detection information using learning data generated based on a large amount of previous chat data, and to output user satisfaction values corresponding to the probability value pattern of the first satisfaction detection information and the probability value pattern of the second satisfaction detection information.

The memory 130 may include a volatile memory, a permanent memory, a virtual memory, or other types of memory for storing information used by or output by the satisfaction analysis device 100. For example, the memory 130 may include random access memory (RAM) or dynamic RAM (DRAM).

The memory 130 stores basic programs, application programs, network setting information, and the like for the operation of the satisfaction analysis device 100. Further, the memory 130 may provide stored information according to a request from either the input/output interface 110 or the processor 120.

The memory 130 may store various data for processing or control of the satisfaction analysis device 100. For example, the memory 130 may store the text feature recognition model, the language feature recognition model, and the satisfaction prediction model that have been trained.

In addition, the memory 130 may store various data generated by the satisfaction analysis device 100. For example, the memory 130 may store the first satisfaction detection information, the second satisfaction detection information, and real-time satisfaction data generated by the processor 120.

Figure 2:
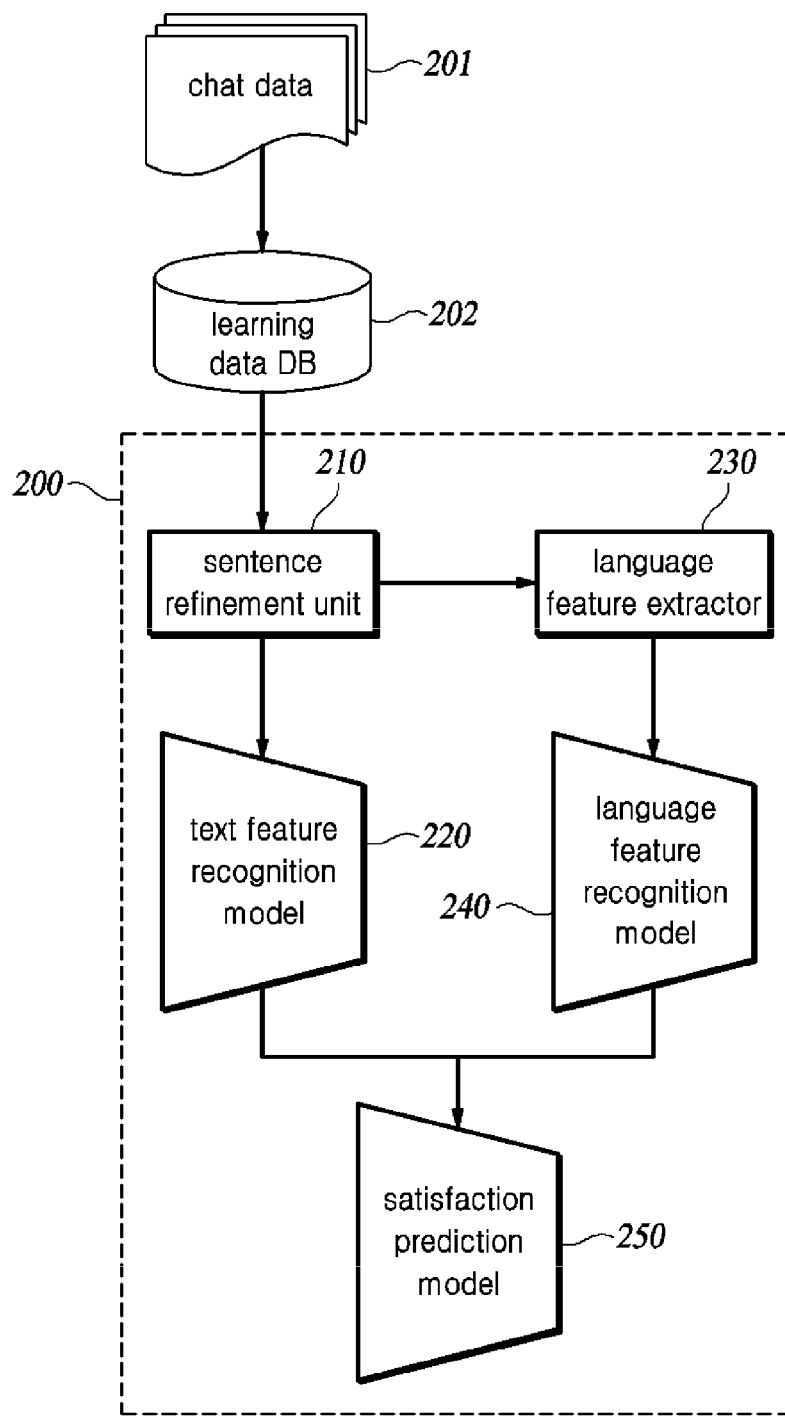
FIG. 2 is a diagram for explaining a process of generating a plurality of learning models included in the satisfaction analysis device according to one embodiment of the present disclosure.

FIG. 2 is a diagram for explaining a process of generating the plurality of learning models included in the satisfaction analysis device according to one embodiment of the present disclosure.

Referring to FIG. 2, the satisfaction analysis device 200 includes a text feature recognition model 220, a language feature recognition model 240, and a satisfaction prediction model 250 that are trained using a machine learning algorithm.

The text feature recognition model 220 is trained to recognize text features related to satisfaction in unit sentences generated from the chat data by using chat data included in a learning data database 202 and satisfaction answer data corresponding to the corresponding chat data as learning data.

The learning data database 202 is built by accumulating a large amount of chat data 201 collected in the course of previous screen sports content experiences. The learning data database 202 may include correct answer data for the user satisfaction determined by using various chat data and various indicators that reflect satisfaction, such as user participation time in the corresponding chat data, utterance occurrence interval, sentence length of the chat data, and frequency of utterance occurrence by user.

When chat data is input from the learning data database 202 to the satisfaction analysis device 200, the sentence refinement unit 210 refines the chat data into one or more unit sentences. The text feature recognition model 220 is trained to recognize text features representing user satisfaction included in the unit sentences.

The language feature recognition model 240 is trained to recognize language features indicating user satisfaction included in a unit sentence based on the speech expression attributes extracted by a language feature extractor 230 from the corresponding unit sentence. In this case, the unit sentence may be the same sentence as the unit sentence input in the learning process of the text feature recognition model 220.

The language feature extractor 230 extracts speech expression attributes based on the sentence structure features of a unit sentence and inputs them to the language feature recognition model 240. The language feature recognition model 240 is trained to predict whether the input speech expression attributes correspond to speech expression attributes that indicate satisfaction of the user.

The satisfaction prediction model 250 is trained to predict the user's satisfaction at the prediction time point by using the first satisfaction detection information output by the text feature recognition model 220 and the second satisfaction detection information output by the language feature recognition model 240 as learning data. In this case, the first satisfaction detection information includes a satisfaction probability value predicted by the text feature recognition model 220 based on the text feature of a unit sentence, and the second satisfaction detection information includes a satisfaction probability value predicted by the language feature recognition model 240 based on the language feature of the unit sentence.

The satisfaction prediction model 250 is trained to finally determine user satisfaction based on the characteristics of probability values predicted based on two different features of the same unit sentence. In this case, the characteristics of the probability value may be, but are not limited to, characteristics of the distribution of two probability values, and may be characteristics of the variation of the probability values appearing in a preset time period.

The text feature recognition model 220, the language feature recognition model 240, and the satisfaction prediction model 250 are repeatedly trained until the accuracy of an output value of an important event occurrence determination model (not shown) is equal to or greater than a preset threshold. In this case, the training processes for the respective models may be performed at different times or may be performed through end-to-end machine learning from input to output of the satisfaction analysis device 200.

Figure 3:
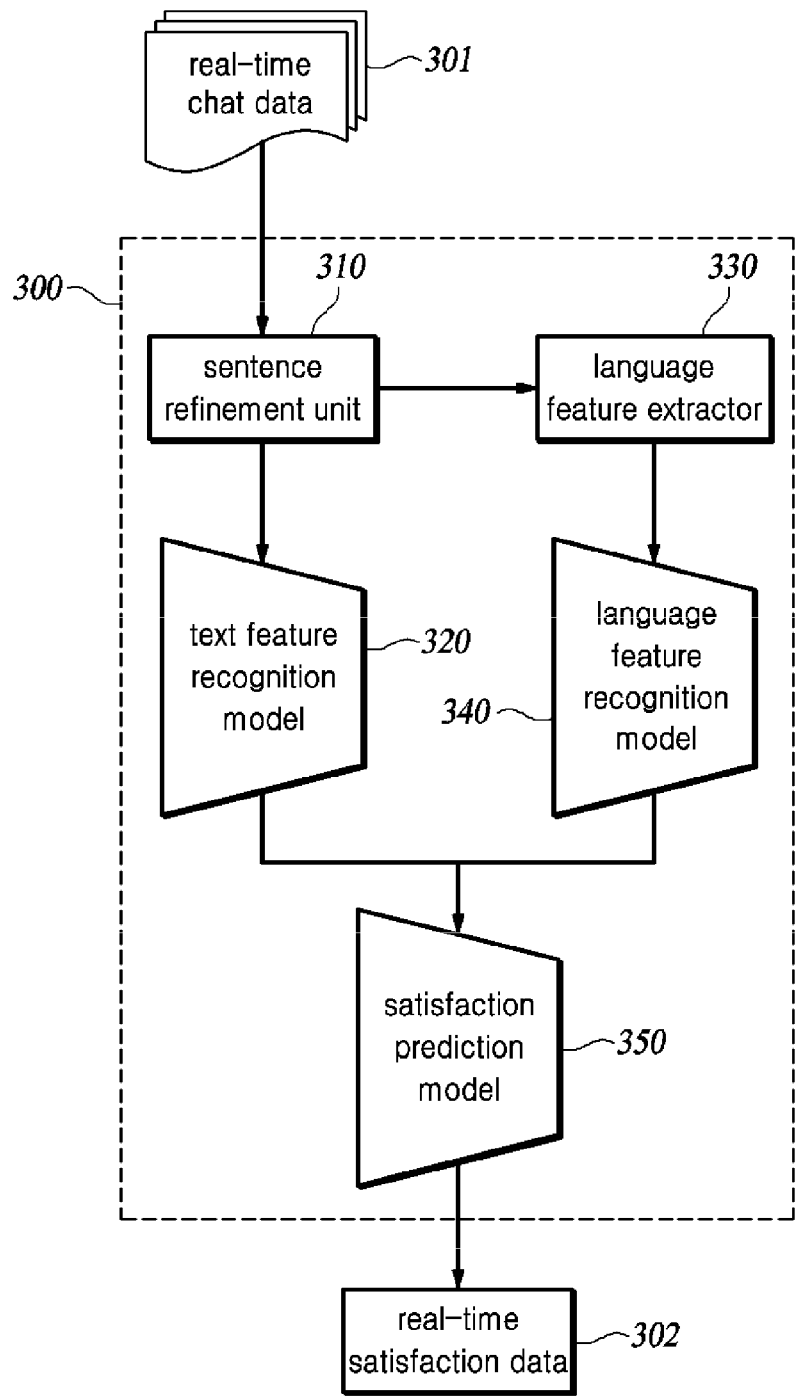
FIG. 3 is a diagram for explaining a process of determining a user's real-time satisfaction level through the satisfaction analysis device according to one embodiment of the present disclosure.

FIG. 3 is a diagram for explaining a process of determining a user's real-time satisfaction level through the satisfaction analysis device according to one embodiment of the present disclosure.

Referring to FIG. 3, a satisfaction analysis device 300 includes a text feature recognition model 320, a language feature recognition model 340, and a satisfaction prediction model 350 that have been trained.

When the screen sports content experience proceeds, real-time chat data 301 input by a plurality of users is input to the satisfaction analysis device 300. In this case, the real-time chat data 301 is time-series data for the entire time period during which the screen sports content experience is conducted, and the chat data constituting the real-time chat data 301 may be tagged with inputter information and input time information.

A sentence refinement unit 310 generates one or more unit sentences by performing sentence refinement on the real-time chat data 301. The generated unit sentences are input to each of the text feature recognition model 320 and a language feature extractor 330.

Based on text features of a unit sentence, the text feature recognition model 320 generates first satisfaction detection information about a probability that the corresponding unit sentence corresponds to a sentence indicating the user's satisfaction.

The language feature extractor 330 extracts linguistic features for the unit sentence and generates speech expression attributes. The language feature recognition model 340 generates second satisfaction detection information about a probability that the corresponding unit sentence corresponds to a sentence indicating the user's satisfaction based on the degree to which the speech expression attributes of the unit sentence correspond to the speech expression attributes that appear when the user is satisfied.

When the generated first satisfaction detection information and second satisfaction detection information are input to the satisfaction prediction model 350, the satisfaction prediction model 350 predicts user satisfaction at the time corresponding to the real-time chat data 301 based on the characteristics of the two detection information, and generates real-time satisfaction data 302.

As described above, the satisfaction analysis device 300 generates the first satisfaction detection information, which is a standardized index for user satisfaction, from text features of unit sentences included in the chat data. At the same time, the satisfaction analysis device 300 generates the second satisfaction detection information, which is a standardized index for user satisfaction, from the speech expression attributes of the unit sentences, and then finally predicts user satisfaction by using different characteristics of the two indicators.

As a result, the satisfaction analysis device 300 more accurately detects reactions of users who are satisfied with the content by complexly analyzing chat data between a plurality of users experiencing the screen sports content.

Figure 4:
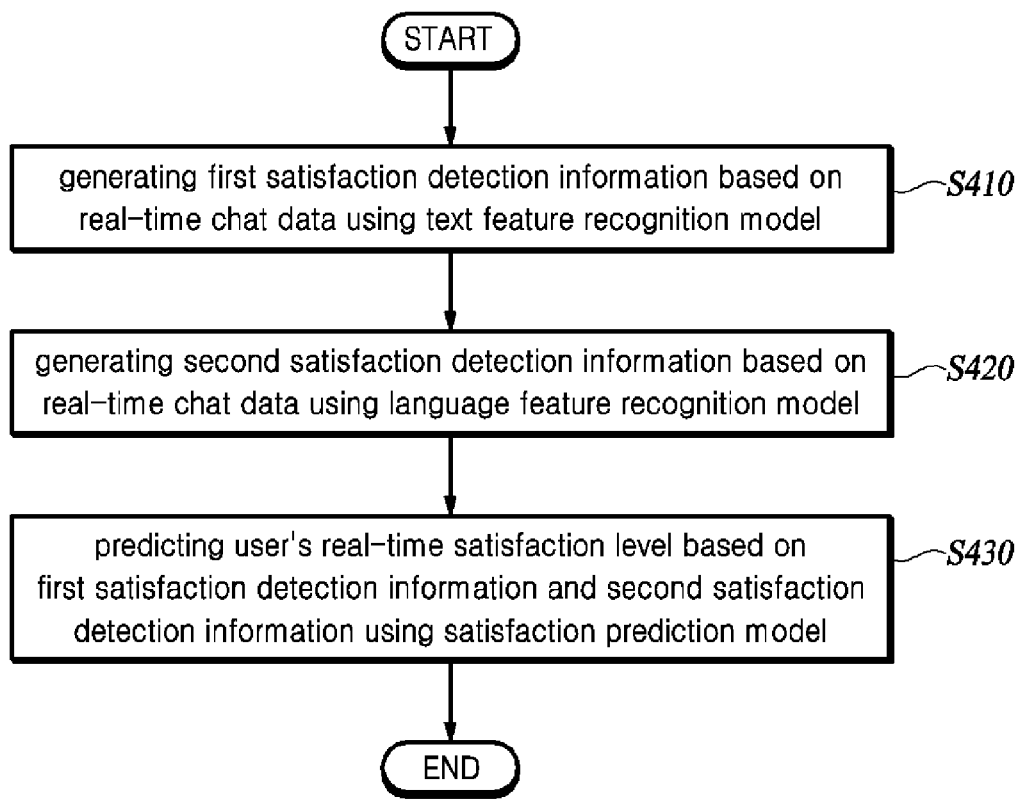
FIG. 4 is a flowchart illustrating a satisfaction analysis method according to one embodiment of the present disclosure.

FIG. 4 is a flowchart illustrating a satisfaction analysis method according to one embodiment of the present disclosure.

Referring to FIG. 4, the satisfaction analysis device generates first satisfaction detection information based on real-time chat data using a text feature recognition model (S410).

In the process of experiencing the screen sports content, chat data between a plurality of users is input in real time to the satisfaction analysis device. In this case, the chat data may include various text data related to conversations exchanged between a plurality of users during the content experiencing process. The users enter chat contents into a chat window in real time, and the input chat contents are displayed to all users through the chat window in the order of input. Accordingly, the inputted real-time chat data may include a plurality of text data arranged according to the input order by the plurality of users.

The satisfaction analysis device generates a unit sentence by performing sentence refinement on real-time chat data. In this case, the sentence refinement is a process of pre-processing various text data included in the chat data into a sentence structure unit having a preset minimum size to obtain a sentence structure or semantic characteristics. The generated unit sentence includes at least one word related to the emotion felt by the user.

The satisfaction analysis device extracts text features based on the meaning of one or more words included in a unit sentence using the trained text feature recognition model, and predicts a satisfaction level represented by the corresponding unit sentence based on the extracted features. Specifically, a user's satisfaction level can be measured based on satisfaction-related text features, which are determined by the presence of satisfaction-related text in the unit sentence and its distribution or frequency.

The trained text feature recognition model generates the first satisfaction detection information based on the extracted text feature. The first satisfaction detection information may be digitized information about a probability that the input unit sentence is a sentence indicating the user's satisfaction.

The trained text feature recognition model may be a model trained to predict a user's satisfaction from the text features of the input unit sentence using the machine learning algorithm. Specifically, the text feature recognition model is trained to learn text features related to a preset satisfaction level using learning data generated based on a large amount of previous chat data, and to output the first satisfaction detection information regarding the probability that the unit sentence is a sentence indicating a user's satisfaction with the screen sports content based on the text features included in the corresponding unit sentence of the real-time chat data.

According to another embodiment, the text feature recognition model may be a neural network model trained using a deep learning algorithm to extract satisfaction-related text features from a unit sentence included chat data, and output a probability that the unit sentence corresponds to a sentence indicating satisfaction of the user as the first satisfaction detection information.

The satisfaction analysis device generates second satisfaction detection information based on real-time chat data using a language feature recognition model (S420).

The satisfaction analysis device performs sentence refinement on the real-time chat data to generate a unit sentence. In this case, the unit sentence is the same as the unit sentence input to the text feature recognition model.

The satisfaction analysis device extracts language features of the unit sentence and generates a speech expression attribute corresponding to the unit sentence. In this case, the speech expression attribute may be a user's emotional information implied from the structure of the unit sentence. The satisfaction analysis device may generate the speech expression attributes for the unit sentence using various natural language processing algorithms.

The satisfaction analysis device extracts language features based on speech expression attributes of the unit sentence using the language feature recognition model that has been trained, and predicts a user's satisfaction indicated by the corresponding unit sentence based on the extracted language features.

The trained language feature recognition model generates the second satisfaction detection information based on the extracted language feature. The second satisfaction detection information may be digitized information about a probability that the input unit sentence is a sentence indicating the user's satisfaction.

The trained language feature recognition model may be a model that has been trained to predict user satisfaction from speech expression attributes of the input unit sentence using a machine learning algorithm. Specifically, the language feature recognition model is trained to learn speech expression attributes related to a preset satisfaction level using learning data generated based on a large amount of previous chat data, and to output the second satisfaction detection information regarding the probability that the unit sentence is a sentence indicating a user's satisfaction with the screen sports content based on the speech expression features included in the corresponding unit sentence of the real-time chat data.

According to another embodiment, the language feature recognition model may be a neural network model trained using a deep learning algorithm to extract satisfaction-related language features from a unit sentence included in the chat data, and to output the probability that the unit sentence corresponds to a sentence indicating satisfaction of the user as the second satisfaction detection information.

The satisfaction analysis device predicts the user's real-time satisfaction level based on the first satisfaction detection information and the second satisfaction detection information using a satisfaction prediction model (S430).

In this case, the first satisfaction detection information includes hourly user satisfaction prediction information predicted based on text features of real-time chat data for an entire screen sports content experience time period, and the second satisfaction detection information includes hourly user satisfaction prediction information predicted based on language features of the chat data at a time point corresponding to the first satisfaction detection information.

The trained satisfaction prediction model can predict user experience satisfaction with the screen sports content based on the pattern characteristics of the first satisfaction detection information and the pattern characteristics of the second satisfaction detection information appearing at the time of satisfaction prediction. In this case, the satisfaction prediction model may be a model trained using a machine learning algorithm to determine final user satisfaction based on a probability value pattern of the input first satisfaction detection information and a probability value pattern of the second satisfaction detection information. Specifically, the satisfaction prediction model may be trained to learn actual user satisfaction corresponding to patterns of two different satisfaction detection information using learning data generated based on a large amount of previous chat data, and to output user satisfaction values corresponding to the probability value pattern of the first satisfaction detection information and the probability value pattern of the second satisfaction detection information.

At least part of the constituting elements described in the exemplary embodiments of the present disclosure may be implemented using a hardware element including at least one of a digital signal processor (DSP), a processor, a controller, an application-specific IC (ASIC), a programmable logic device (e.g., FPGA), and other electronic components or a combination thereof. Also, at least some of the functions or processes described in the exemplary embodiments may be implemented using software, and the software may be stored in a recording medium. At least part of the constituting elements, functions, and processes described in the exemplary embodiments of the present disclosure may be implemented through a combination of hardware and software.

A method according to exemplary embodiments of the present disclosure may be implemented using a program that may be executed in a computer and may be implemented using various types of recording media, including a magnetic storage device, an optical recording medium, and a digital storage device.

Various techniques described in the present disclosure may be implemented using digital electronic circuitry, computer hardware, firmware, software, or combinations thereof. The implementations may be realized as a computer program tangibly embodied in a computer program product, i.e., an information carrier, e.g., a machine-readable storage device (computer-readable recording medium) or a radio signal for processing by or controlling the operation of a data processing device, e.g., a programmable processor, a computer, or a plurality of computers. Computer programs, such as the computer program(s) described above, may be written in any form of programming language, including compiled or interpreted languages, and may be written in any form including a stand-alone program or another unit suitable to be used in a module, a component, a subroutine, or a computing environment. The computer programs may be deployed for processing on one computer or multiple computers at one site or distributed across multiple sites and interconnected by a communications network.

Processors suitable for processing computer programs include, for example, both general-purpose and special-purpose microprocessors and any one or more processors of any type of digital computer. Typically, a processor will receive instructions and data from a read-only memory, a random access memory, or both. Elements of a computer may include at least one processor that executes instructions and one or more memory devices storing instructions and data. Generally, a computer may include one or more mass storage devices storing data, such as magnetic disks, magneto-optical disks, or optical disks, receive data from the mass storage devices, transmit data to the mass storage devices, or transmit and receive to and from the mass storage devices. Information carriers suitable for embodying computer program instructions and data include, for example, semiconductor memory devices; magnetic media such as hard disks, floppy disks, and magnetic tapes; optical media such as Compact Disk Read Only Memory (CD-ROM), Digital Video Disk (DVD); magneto-optical media such as floptical disk; Read Only Memory (ROM); Random Access Memory (RAM); flash memory; Erasable Programmable ROM (EPROM); and Electrically Erasable Programmable ROM (EEPROM). The processor and the memory may be supplemented by or included in special purpose logic circuitry.

The processor may execute an operating system and software applications executed on the operating system. Also, the processor device may access, store, manipulate, process, and generate data in response to the execution of software. For the convenience of understanding, the processor device may be described as being used as a single processor device, but it should be understood by those skilled in the art that the processor device includes multiple processing elements and/or multiple types of processing elements. For example, a processor device may include multiple processors or one processor and one controller. Also, other processing configurations, such as parallel processors, are possible.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, one of ordinary skill would understand that the scope of the claimed invention is not to be limited by the above explicitly described embodiments but by the claims and equivalents thereof.

What is claimed is:

1. A method of analyzing user satisfaction of a screen sports content, the method comprising:
generating a unit sentence by performing sentence refinement on real-time chat data of a user, wherein the sentence refinement comprises pre-processing the real-time chat data into a sentence structure unit of a predetermined minimum size to obtain sentence structures or semantic features;
generating first satisfaction detection information based on text features extracted from the unit sentence using a text feature recognition model;
generating second satisfaction detection information by extracting language features of the unit sentence, generating a speech expression attribute corresponding to the unit sentence, and inputting the speech expression attribute into a language feature recognition model; and
predicting real-time satisfaction of the user of the screen sports content based on the first satisfaction detection information and the second satisfaction detection information using a satisfaction prediction model.

2. The method of claim 1, wherein the text feature recognition model is a model that is trained to recognize whether a text related to satisfaction of the user exists in the unit sentence based on the text features extracted from the unit sentence.

3. The method of claim 1, wherein the language feature recognition model is a model that is trained to recognize whether the unit sentence is a sentence related to satisfaction of the user based on the speech expression attribute.

4. The method of claim 1, wherein the satisfaction prediction model is a model that is trained to predict, based on a pattern of the first satisfaction detection information and a pattern of the second satisfaction detection information at a time point corresponding to the real-time chat data, satisfaction of the user at the corresponding time point.

5. A satisfaction analysis device comprising:
a memory that stores one or more instructions; and
one or more processors to execute the one or more instructions stored in the memory,
wherein the processor is configured to:
generate a unit sentence by performing sentence refinement on real-time chat data of a user, wherein the sentence refinement comprises pre-processing the real-time chat data into a sentence structure unit of a predetermined minimum size to obtain sentence structures or semantic features;
generate first satisfaction detection information based on text features extracted from the unit sentence using a text feature recognition model;
generate second satisfaction detection information by extracting language features of the unit sentence, generating a speech expression attribute corresponding to the unit sentence, and inputting the speech expression attribute into a language feature recognition model; and
predict real-time satisfaction of the user of a screen sports content based on the first satisfaction detection information and the second satisfaction detection information using a satisfaction prediction model.

6. The satisfaction analysis device of claim 5, wherein the text feature recognition model is a model that is trained to recognize whether a text related to satisfaction of the user exists in the unit sentence based on the text features extracted from the unit sentence.

7. The satisfaction analysis device of claim 5, wherein the language feature recognition model is a model that is trained to recognize whether the unit sentence is a sentence related to satisfaction of the user based on the speech expression attribute.

8. The satisfaction analysis device of claim 5, wherein the satisfaction prediction model is a model that is trained to predict, based on a pattern of the first satisfaction detection information and a pattern of the second satisfaction detection information at a time point corresponding to the real-time chat data, satisfaction of the user at the corresponding time point.

* * * * *